United States Patent [19]
Girard

[11] 4,331,394
[45] May 25, 1982

[54] ANTITHEFT DEVICE FOR SPECTACLES EXHIBITED FOR SELLING PURPOSES

[76] Inventor: Edouard Girard, 64, rue de Miromesnil, 75008 Paris, France

[21] Appl. No.: 887,320

[22] Filed: Mar. 16, 1978

[30] Foreign Application Priority Data

Mar. 16, 1977 [FR] France .................................. 77 07773

[51] Int. Cl.³ .......................... G02C 1/00; G02C 5/14
[52] U.S. Cl. ..................................... 351/158; 351/111
[58] Field of Search ....................... 351/158, 111, 121

[56] References Cited

U.S. PATENT DOCUMENTS 3,890,672  6/1975  Berthagen ..................... 351/121 X Primary Examiner—John K. Corbin
Assistant Examiner—Rodney Bovernick
Attorney, Agent, or Firm—Remy J. VanOphem

[57] ABSTRACT

An antitheft device for spectacles which are being freely exhibited for selling purposes, comprises a sleeve member fitted on at least one arm of the spectacles, at the hinge portion thereof. In use, the sleeve abuts against the spectacle frame and keeps the spectacle arm in its open position relative to the frame, thus preventing a thief from folding and surreptitiously pocketing the spectacles.

5 Claims, 5 Drawing Figures

ANTITHEFT DEVICE FOR SPECTACLES EXHIBITED FOR SELLING PURPOSES

FIELD OF THE INVENTION

The present invention relates to an antitheft device for spectacles, especially sun-glasses, which are being exhibited for selling purposes in department-stores and the like.

BACKGROUND OF THE INVENTION

The antitheft expedients which have been so far devised for avoiding the theft of spectacles being exhibited at selling facilities, comprise:

- an unbreakable tag placed on the bridge of the spectacles; this expedient hinders the customer from trying on the spectacles while, on the other hand, does not prevent the spectacles from being folded and possibly pocketed;
- a transparent, sealed envelope in which the spectacles are placed; clearly, this expedient prevents a customer from trying on the spectacles and, consequently, impairs the sale of the spectacles;
- a large sized label bearing the name of the manufacturer and similar information printed on it, fixedly secured to the spectacles, the size of the label being such as to prevent anyone from pocketing the spectacles; this expedient presents two drawbacks: firstly, such labels prevent a customer from comfortably trying on the spectacles, and, secondly, they require specially designed exhibition racks or stands which are more expensive and, in any event, less effective than the conventional racks.

The antitheft device according to the present invention permits the foregoing drawbacks to be eliminated. It permits spectacles to be exhibited, while achieving utmost protection against theft, on any conventional rack or stand which is generally designed so as to permit easy handling and satisfactory display of the articles on sale to occur.

Furthermore, the antitheft device according to the present invention is particularly advantageous insofar as it does not hinder a potential customer from trying on the spectacles. Besides, the device does not affect the aesthetic appearance of the spectacles.

SUMMARY OF THE INVENTION

To this end, the antitheft device of the present invention is characterized in that it comprises means for locking at least one of the spectacle bars in its open position, said means being suitable for preventing the spectacles from being unduly folded and pocketed.

BRIEF DESCRIPTION OF THE DRAWINGS

The characteristics and advantages of the antitheft device of the present invention will become more evident from the following detailed description of a preferred embodiment thereof, with reference to the attached drawings, in which.

DESCRIPTION OF THE PREFERRED EMBODIMENT

Figure 1:
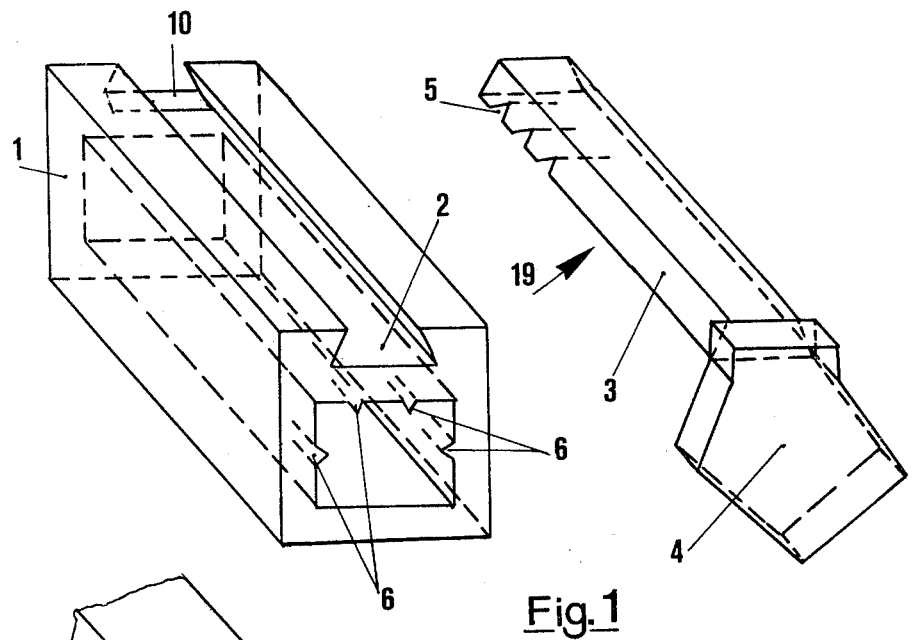
FIG. 1 is a perspective, exploded view of the antitheft device of the present invention.
Figure 2:
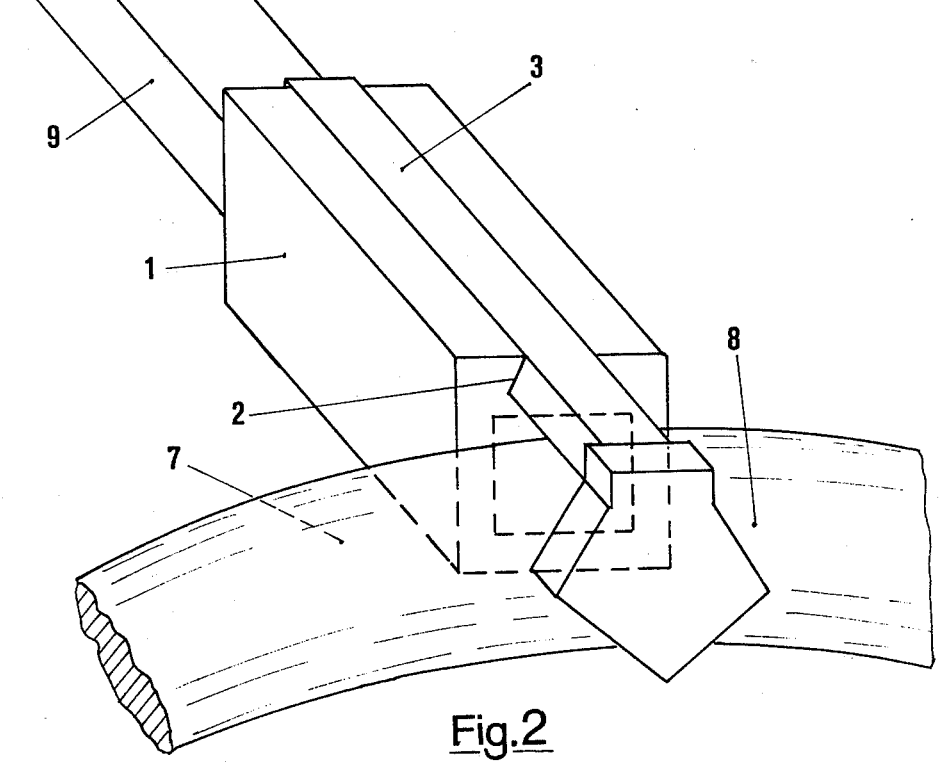
FIG. 2 is a perspective view showing the device fitted to one of the hinges of the spectacles.

Referring particularly to FIGS. 1 and 2, of the drawings, the preferred embodiment of the antitheft device carries out the locking of the spectacle hinges. The antitheft device comprises a locking clamp on each one of the hinges. The clamps comprises a sleeve-shaped body 1 made of a suitably elastic material such as polyethylene, natural or synthetic rubber and the like. The outer side of the body 1 is provided with a longitudinally extending groove 2 suitable for receiving a locking hook which will hereinafter be described in detail.

The inner walls of the body 1 are provided with longitudinally extending ribs 6 which, upon compression, are suitable to take up slack existing between the inner surface of body 1 and the spectacle bar 9 because of thickness and width differences of bars depending on the various spectacle types.

The spectacle bar 9 is inserted into the sleeve-shaped body 1. The sleeve is caused to slide snugly onto the bar, until it reaches an abutting position against the corresponding hinge (not shown), thus locking it in its open position.

The locking action is also brought about by one end of the sleeve-shaped body 1 abutting against the inner side of the spectacle-frame 7. If the height of body 1 exceeds the width of the spectacle-frame 7, the above-mentioned locking action also takes place because the end of the body 1 abuts against the spectacle lens.

The antitheft device of the present invention also comprises a locking hook 19 consisting of a substantially parallelepiped-shaped slider member 3, slidably and snugly received within the groove 2. The slider member 3 is provided, at one end, with an essentially prismatic-shaped appendix 4 at right angles to the slider. At its opposite end, on the same side from which the appendix 4 projects from the slider, the slider has a plurality of notches 5 running transversally to the longitudinal axis of the slider.

These notches 5 are suitable for engaging the upper edge of a wall 10 placed at one end of the groove 2 and running transversally thereto, thus locking the hook 19 to the body 1.

The locking hook 19 is preferably made of a material having higher stiffness than the body 1.

When the hook 19 is inserted into the groove 2 of the body 1, its appendix 4 ultimately abuts against the outer side 8 of the spectacle-frame, thus preventing the arm from being folded into its closed position.

The locking action is brought about because the notches 5 engage the upper edge of the wall 10, thus firmly, though removably, holding the appendix 4 against the side 8 of the spectacle-frame.

Also in the case, if the height of the appendix exceeds the spectacle-frame thickness, the appendix abuts against the spectacle lens.

It is apparent that, when the antitheft device of the present invention is operatively positioned on the spectacles (as shown in FIG. 2), it is impossible to fold down the spectacle arms to their closed position, because they are locked at three zones. The locking action is carried out:

by the body 1 which surrounds and locks the hinge;

by that end of the body 1 which abuts against the inner side 7 of the spectacle-frame; and by the appendix of the locking hook abutting against the outer side of the frame, thus stiffening the whole device.

The antitheft device of the present invention can be manufactured in various colors, different from the colors of the spectacle-frame, thus permitting a person unduly wearing the spectacles to be singled out. The device is easily removable by the personnel of the sales-department, after the spectacles have been sold.

Figures 3, 5:
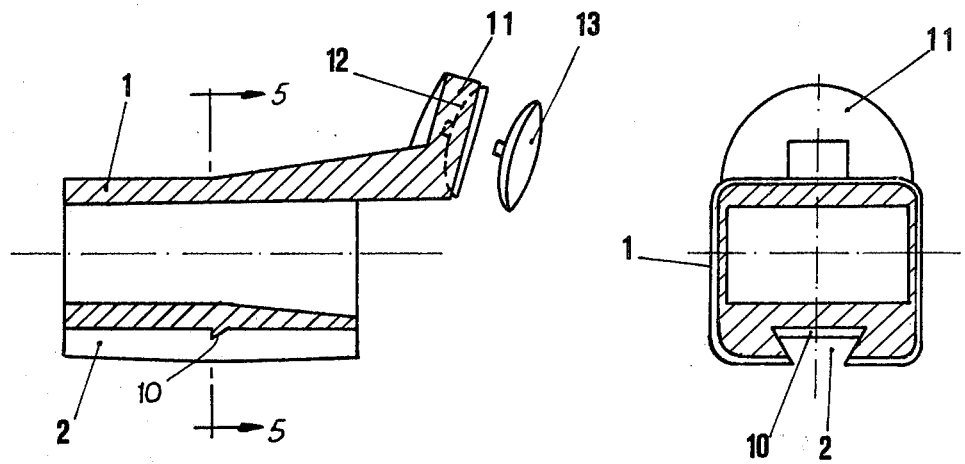
FIG. 3 is an elevation side view, partly broken away to show inner construction, of a first member of a further embodiment of the device of this invention.
FIG. 5 is an elevation end view of the member shown in FIG. 3, taken along 5—5.
Figure 4:
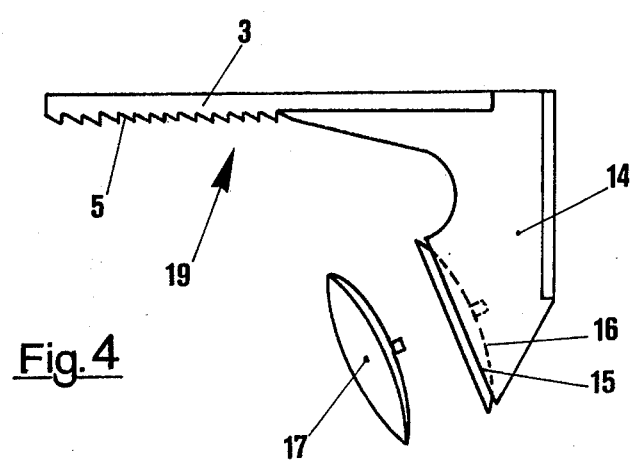
FIG. 4 is an elevation side view of a second member cooperating with the first member shown in FIG. 3.

With reference to FIGS. 3 and 4, a further embodiment of the antitheft device according to the present invention, is disclosed.

According to this embodiment also, the device comprises a sleeve-shaped body 1, which, in this case, has a cylindrically-shaped appendix 11, at a slight angle to the longitudinal axis of the body 1. The appendix 11 presents in its forward portion a substantially semi-spherical recess 12 (illustrated with dotted line in FIG. 3) suitable for receiving a suction means 13, shown in extracted position in FIG. 3. The size of the recess 12 is such that the rim of the suction means 13 protrudes from the contour of the recess, so that, when the body 1 is applied to the spectacles, the suction means 13 adheres to the spectacle-frame, thus strengthening the locking action.

According to this embodiment (see FIG. 5) the longitudinal groove 2 of the body 1 is arranged on the side opposite to the side from which the appendix 11 protrudes. Also the groove 2 is provided with a projecting wall 10 suitable for holding in engaging relationship the locking hook herebelow described with reference to FIG. 4.

Also in this case, the locking hook 19 comprises an essentially parallelepiped-shaped slider member 3 provided with a plurality of notches 5 for engagement with the protruding wall 10 and having at one end thereof an essentially prismatic-shaped appendix 14. The appendix 14 has in its inclined face 15 a substantially semi-spherical recess 16 (illustrated with dotted line in FIG. 4) suitable for receiving a suction means 17 (illustrated in its extracted position in FIG. 4). The size of the recess 16 is such that the rim of the suction means 17 slightly protrudes from the recess contour. In this way, when the locking hook is inserted into the body 1, the suction means 17 adheres to the spectacle lens.

This latter embodiment is particularly useful because it not only achieves a more effective locking action, but also it avoids scoring the lens, particularly when the lens is made of a plastic material.

The suction means could be substituted, for instance, by small pieces of felt cut in such a way as to match the shape of either recess 12 or 16 and glued therein.

According to a further embodiment of the antitheft device of the present invention, the means for locking the spectacle arms in their open position comprises a rigid crosspiece which is arranged between the spectacle arms and is fixedly secured to the ends thereof.

According to a further embodiment of the invention, one or more connections join from the outside one or both of the spectacle arms to another part of the spectacles, or join the arms to each other so as to keep them in their open position.

The device of this invention can be advantageously used for preventing the theft of spectacles, especially sun-glasses, exhibited on display racks or in bulk for selling purposes in retail stores, department-stores, self-services and the like.

Changes and/or modifications could be made to the embodiments as shown of the antitheft device of the present invention, without thereby departing from the spirit and scope of the invention as defined by the appended claims.

For instance, one could modify the shape of the extension 4 with a view to bringing about a more effective locking action of the device. Moreover, a plurality of teeth might advantageously substitute for the notches 5. In this latter case, a plurality of corresponding notches in the groove 2 will substitute for the wall 10.

Finally, one could modify the end portion of the surface of the body 1, which abuts against the spectacle frame, for instance by providing a peripheral projection in order to widen the bearing surface, thereby making more effective the device locking action.

What I claim is:

1. An antitheft device for spectacles being freely exhibited for selling purposes, the spectacles comprising a frame; a pair of bars and a hinge connecting each bar to the frame; and means for locking at least one of said hinges in its open position, thereby preventing folding thereof, said locking means further comprising a sleeve which can be snugly fitted onto one of said pair of bars and is suitable for covering the hinge connecting said one of said pair of bars to the frame while one end of said sleeve abuts against said spectacle frame.

2. The antitheft device of claim 1 wherein, said sleeve is provided on its outer wall with a longitudinally extending groove having at least one transverse wall and an inner wall.

3. The antitheft device of claim 2 wherein, said locking means comprises a locking hook comprising a slider member which can be slidably inserted within the longitudinally extending groove of the sleeve and is provided at one end with a substantially transverse extension, at its opposite end being provided with a plurality of notches suitable for insertion on the inner wall of the sleeve groove.

4. The antitheft device of claim 2 wherein, said sleeve has an inner wall with a plurality of longitudinally extending ribs.

5. The antitheft device of claim 1 wherein, said locking means further comprises suction means at the zone to be applied to said frame.

* * * * *

UNITED STATES PATENT AND TRADEMARK OFFICE
CERTIFICATE OF CORRECTION

PATENT NO. : 4,331,394

DATED : May 25, 1982

INVENTOR(S) : Edouard Girard

It is certified that error appears in the above-identified patent and that said Letters Patent is hereby corrected as shown below:

Column 2, Line 59: After "Also in" delete "the" and insert --- this ---

Column 4, Line 31: Delete "spectacles" and insert --- device ---

Signed and Sealed this

Twenty-second Day of February 1983

[SEAL]

Attest:

GERALD J. MOSSINGHOFF

Attesting Officer    Commissioner of Patents and Trademarks